(12) United States Patent
Karaoguz et al.

(10) Patent No.: US 8,947,506 B2
(45) Date of Patent: Feb. 3, 2015

(54) METHOD AND SYSTEM FOR UTILIZING DEPTH INFORMATION FOR GENERATING 3D MAPS

(75) Inventors: Jeyhan Karaoguz, Irvine, CA (US); Nambi Seshadri, Irvine, CA (US); Xuemin Chen, Rancho Sante Fe, CA (US); Chris Boross, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 701 days.

(21) Appl. No.: 13/077,899

(22) Filed: Mar. 31, 2011

(65) Prior Publication Data
US 2012/0050479 A1    Mar. 1, 2012

Related U.S. Application Data

(60) Provisional application No. 61/439,083, filed on Feb. 3, 2011, provisional application No. 61/377,867, filed on Aug. 27, 2010.

(51) Int. Cl.
| | |
|---|---|
| H04N 13/02 | (2006.01) |
| H04N 13/00 | (2006.01) |
| H04N 21/422 | (2011.01) |
| H04N 21/414 | (2011.01) |
| H04N 21/4223 | (2011.01) |
| H04N 21/81 | (2011.01) |

(52) U.S. Cl.
CPC ....... *H04N 13/0011* (2013.01); *H04N 13/0059* (2013.01); *H04N 21/422* (2013.01); *H04N 21/41407* (2013.01); *H04N 21/4223* (2013.01); *H04N 21/816* (2013.01)
USPC .......................................................... 348/46

(58) Field of Classification Search
None
See application file for complete search history.

(56) References Cited

U.S. PATENT DOCUMENTS

| | | | | |
|---|---|---|---|---|
| 2005/0164679 | A1* | 7/2005 | Beardow | 455/412.1 |
| 2008/0031327 | A1* | 2/2008 | Wang et al. | 375/240.12 |
| 2008/0170142 | A1* | 7/2008 | Kawata et al. | 348/294 |
| 2010/0087183 | A1* | 4/2010 | Porro et al. | 455/420 |
| 2010/0125409 | A1* | 5/2010 | Prehofer | 701/207 |
| 2011/0022301 | A1* | 1/2011 | Lee | 701/201 |

OTHER PUBLICATIONS

Real time Hand Gesture Recognition using a Range Camera Zhi Li, Ray Jarvis Monash University Wellington Road Clayton, Victoria Austrailia.
Comparison of Stereo Video Coding Support in MPEG-4 MAC, H.264/AVC and H.264.SVC C.T.E.R. Hewage, H.A. Karim, S.Worall, S.Dogan, A.M. Kondoz Centre for Communication Systems Research University of Surrey Guildford, Surrey, GU2 7XH, U.K.

* cited by examiner

*Primary Examiner* — Sath V Perungavoor
*Assistant Examiner* — Kate Luo
(74) *Attorney, Agent, or Firm* — Brinks Gilson & Lione

(57) ABSTRACT

A mobile device, which comprises a monoscopic three-dimensional (3D) video generation device, one or more depth sensors and one or more devices operable to determine distance, may be operable to capture two-dimensional (2D) video image data and corresponding depth information of surroundings of the mobile device. The mobile device may capture distance information via the one or more devices operable to determine distance. A 3D map may be rendered by the mobile device utilizing the captured 2D video image data, the captured corresponding depth information and/or the captured distance information. The monoscopic 3D video generation device may comprise one or more image sensors. The one or more devices operable to determine distance may comprise an optical and/or electromagnetic emitting device. The 3D map may be generated by the mobile device. The 3D map may also be generated by the mobile device based on information received from a location server.

20 Claims, 9 Drawing Sheets

METHOD AND SYSTEM FOR UTILIZING DEPTH INFORMATION FOR GENERATING 3D MAPS

CROSS-REFERENCE TO RELATED APPLICATIONS/INCORPORATION BY REFERENCE

This patent application makes reference to, claims priority to, and claims benefit from:
U.S. Provisional Application Ser. No. 61/377,867, which was filed on Aug. 27, 2010; and
U.S. Provisional Application Ser. No. 61/439,083, which was filed on Feb. 3, 2011.
This application also makes reference to:
U.S. Patent Application Ser. No. 61/439,193 filed on Feb. 3, 2011;
U.S. patent application Ser. No. 13/077,900 filed on Mar. 31, 2011;
U.S. Patent Application Ser. No. 61/439,274 filed on Feb. 3, 2011;
U.S. patent application Ser. No. 13/077,912 filed on Mar. 31, 2011;
U.S. Patent Application Ser. No. 61/439,283 filed on Feb. 3, 2011;
U.S. patent application Ser. No. 13/077,922 filed on Mar. 31, 2011;
U.S. Patent Application Ser. No. 61/439,130 filed on Feb. 3, 2011;
U.S. patent application Ser. No. 13/077,886 filed on Mar. 31, 2011;
U.S. Patent Application Ser. No. 61/439,290 filed on Feb. 3, 2011;
U.S. patent application Ser. No. 13/077,926 filed on Mar. 31, 2011;
U.S. Patent Application Ser. No. 61/439,119 filed on Feb. 3, 2011;
U.S. patent application Ser. No. 13/077,893 filed on Mar. 31, 2011;
U.S. Patent Application Ser. No. 61/439,297 filed on Feb. 3, 2011;
U.S. patent application Ser. No. 13/077,923 filed on Mar. 31, 2011;
U.S. Patent Application Ser. No. 61/439,201 filed on Feb. 3, 2011;
U.S. Patent Application Ser. No. 61/439,209 filed on Feb. 3, 2011;
U.S. Patent Application Ser. No. 61/439,113 filed on Feb. 3, 2011;
U.S. patent application Ser. No. 13/077,868 filed on Mar. 31, 2011;
U.S. Patent Application Ser. No. 61/439,103 filed on Feb. 3, 2011;
U.S. patent application Ser. No. 13/077,880 filed on Mar. 31, 2011;
U.S. Patent Application Ser. No. 61/439,301 filed on Feb. 3, 2011; and
U.S. patent application Ser. No. 13/077,930 filed on Mar. 31, 2011.
Each of the above stated applications is hereby incorporated herein by reference in its entirety.

FIELD OF THE INVENTION

Certain embodiments of the invention relate to communication systems. More specifically, certain embodiments of the invention relate to a method and system for utilizing depth information for generating 3D maps.

BACKGROUND OF THE INVENTION

Digital video capabilities may be incorporated into a wide range of devices such as, for example, mobile devices, digital televisions, digital direct broadcast systems, digital recording devices, and the like. Digital video devices may provide significant improvements over conventional analog video systems in processing and transmitting video sequences with increased bandwidth efficiency. Mobile devices with built-in video cameras have become prevalent in the mobile device market, due to the low cost of CMOS image sensors and the ever increasing customer demand for more advanced mobile devices with video capabilities.

Video content may be recorded in two-dimensional (2D) format or in three-dimensional (3D) format. In various applications such as, for example, the DVD movies and the digital TV (DTV), a 3D video is often desirable because it is often more realistic to viewers than the 2D counterpart. A 3D video comprises a left view video and a right view video.

Various video encoding standards, for example, MPEG-1, MPEG-2, MPEG-4, MPEG-C part 3, H.263, H.264/MPEG-4 advanced video coding (AVC), multi-view video coding (MVC) and scalable video coding (SVC), have been established for encoding digital video sequences in a compressed manner. For example, the MVC standard, which is an extension of the H.264/MPEG-4 AVC standard, may provide efficient coding of a 3D video. The SVC standard, which is also an extension of the H.264/MPEG-4 AVC standard, may enable transmission and decoding of partial bitstreams to provide video services with lower temporal or spatial resolutions or reduced fidelity, while retaining a reconstruction quality that is similar to that achieved using the H.264/MPEG-4 AVC.

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing depth information for generating 3D maps, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
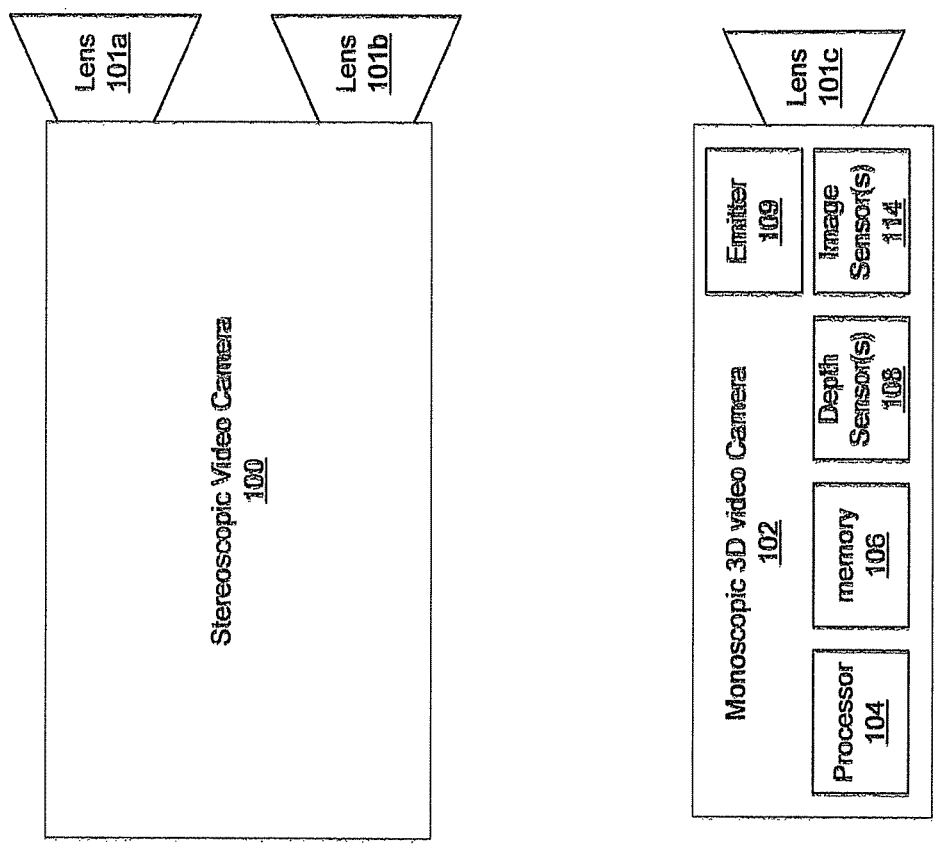
FIG. 1A is a block diagram that illustrates an exemplary monoscopic 3D video camera embodying aspects of the present invention, compared with a conventional stereoscopic video camera.

Certain embodiments of the invention can be found in a method and system for utilizing depth information for generating 3D maps. In various embodiments of the invention, a mobile device, which comprises a monoscopic three-dimensional (3D) video generation device, may be operable to capture two-dimensional (2D) video image data and corresponding depth information of surroundings of the mobile device. The captured 2D video image data and the captured corresponding depth information may be communicated by the mobile device to a location server. The location server may generate one or more 3D maps associated with a location of the mobile device based on the corresponding depth information. The mobile device may be operable to receive the one or more 3D maps from the location server. In this regard, the monoscopic 3D video generation device in the mobile device may comprise an emitter and one or more depth sensors.

In an exemplary embodiment of the invention, the 2D video image data may be captured via, for example, one or more image sensors in the monoscopic 3D video generation device in the mobile device. The corresponding depth information may be captured via, for example, the one or more depth sensors in the monoscopic 3D video generation device in the mobile device. The location server may be operable to determine the location of the mobile device based on the 2D video image data and the corresponding depth information, and generate the one or more 3D maps associated with the location of the mobile device based on the corresponding depth information. The mobile device may be operable to receive the generated location of the mobile device and the one or more 3D maps from the location server.

In an exemplary embodiment of the invention, the mobile device may be operable to emit one or more signals, via the emitter in the monoscopic 3D video generation device in the mobile device, to one or more other monoscopic 3D video generation devices surrounding the mobile device. In this regard, each of the one or more other monoscopic 3D video generation devices may determine distance information for the mobile device based on the emitted one or more signals. The mobile device may receive the distance information and a known location associated with each of the one or more other monoscopic 3D video generation devices from each of the one or more other monoscopic 3D video generation devices. The mobile device may also receive, from each of the one or more other monoscopic 3D video generation devices, the 2D video image data and the corresponding depth information that are captured by each of the one or more other monoscopic 3D video generation devices. In such instances, the mobile device may be operable to determine its location based on the received distance information and the known location associated with each of the one or more other monoscopic 3D video generation devices. The location of the mobile device, the received 2D video image data and the received corresponding depth information may be communicated by the mobile device to the location server. The location server may then generate the one or more 3D maps associated with the location of the mobile device, based on the corresponding depth information. In one embodiment of the invention, the mobile device may be in an indoor environment.

In various embodiments of the invention, a mobile device, which comprises a monoscopic 3D video generation device, one or more depth sensors and one or more devices operable to determine distance, may be operable to capture or receive 2D video image data and corresponding depth information of surroundings of the mobile device. The mobile device may be operable to capture or receive distance information via the one or more devices that are operable to determine distance. A 3D map may be rendered by the mobile device utilizing the captured 2D video image data, the captured corresponding depth information and/or the captured distance information. In this regard, the monoscopic 3D video generation device may comprise one or more image sensors. The one or more devices operable to determine distance may comprise an optical and/or electromagnetic emitting device. In one embodiment of the invention, the 3D map may be generated by the mobile device. In another embodiment of the invention, the 3D map may be generated by the mobile device based on information received from a location server, for example.

In an exemplary embodiment of the invention, the 2D video image data may be captured via the one or more image sensors of the monoscopic 3D video generation device in the mobile device, and the corresponding depth information may be captured via the one or more depth sensors in the mobile device. The mobile device may be operable to communicate the captured 2D video image data and the captured corresponding depth information to the location server. The location server may be operable to determine a location of the mobile device based on the 2D video image data and the corresponding depth information, and generate the 3D map associated with the location of the mobile device based on the corresponding depth information. The mobile device may receive the generated location of the mobile device and the 3D map from the location server.

In an exemplary embodiment of the invention, the mobile device may be operable to emit one or more signals, via the one or more devices operable to determine distance, to one or more other monoscopic 3D video generation devices surrounding the mobile device. In this regard, each of the one or more other monoscopic 3D video generation devices may determine distance information for the mobile device based on the emitted one or more signals. The mobile device may receive the distance information and a known location associated with each of the one or more other monoscopic 3D video generation devices from each of the one or more other monoscopic 3D video generation devices. In addition, the mobile device may receive, from each of the one or more other monoscopic 3D video generation devices, the 2D video image data and the corresponding depth information that are captured by each of the one or more other monoscopic 3D video generation devices. In this regard, the mobile device may be operable to determine a location of the mobile device based on the received distance information and the known location associated with each of the one or more other monoscopic 3D video generation devices. The mobile device may communicate or transmit the location of the mobile device, the 2D video image data and the corresponding depth information to the location server. The location server may be operable to generate the 3D map associated with the location of the mobile device based on the corresponding depth information. The mobile device may then receive the generated 3D map from the location server.

FIG. 1A is a block diagram that illustrates an exemplary monoscopic 3D video camera embodying aspects of the present invention, compared with a conventional stereoscopic video camera. Referring to FIG. 1A, there is shown a stereoscopic video camera 100 and a monoscopic 3D video camera 102. The stereoscopic video camera 100 may comprise two lenses 101*a* and 101*b*. Each of the lenses 101*a* and 101*b* may capture images from a different viewpoint and images captured via the two lenses 101*a* and 101*b* may be combined to generate a 3D image. In this regard, electromagnetic (EM) waves in the visible spectrum may be focused on a first one or more image sensors by the lens 101*a* (and associated optics) and EM waves in the visible spectrum may be focused on a second one or more image sensors by the lens (and associated optics) 101*b*.

The monoscopic 3D video camera 102 may comprise a processor 104, a memory 106, an emitter 109, one or more depth sensors 108 and one or more image sensors 114. The monoscopic 3D or single-view video camera 102 may capture images via a single viewpoint corresponding to the lens 101*c*. In this regard, EM waves in the visible spectrum may be focused on one or more image sensors 114 by the lens 101*c*. The monoscopic 3D video camera 102 may also capture depth information via the lens 101*c* (and associated optics).

The processor 104 may comprise suitable logic, circuitry, interfaces, and/or code that may be operable to manage operation of various components of the monoscopic 3D video camera 102 and perform various computing and processing tasks.

The memory 106 may comprise, for example, DRAM, SRAM, flash memory, a hard drive or other magnetic storage, or any other suitable memory devices. For example, SRAM may be utilized to store data utilized and/or generated by the processor 104 and a hard-drive and/or flash memory may be utilized to store recorded image data and depth data.

The depth sensor(s) 108 may each comprise suitable logic, circuitry, interfaces, and/or code that may be operable to detect EM waves in the infrared spectrum and determine depth information based on reflected infrared waves. For example, depth information may be determined based on time-of-flight of infrared waves transmitted by the emitter 109 in the monoscopic 3D video camera 102 and reflected back to the depth sensor(s) 108. Depth information may also be determined using a structured light method, for example. In such instance, a pattern of light such as a grid of infrared waves may be projected at a known angle onto an object by a light source such as a projector. The depth sensor(s) 108 may detect the deformation of the light pattern such as the infrared light pattern on the object. Accordingly, depth information for a scene may be determined or calculated using, for example, a triangulation technique.

The image sensor(s) 114 may each comprise suitable logic, circuitry, interfaces, and/or code that may be operable to convert optical signals to electrical signals. Each image sensor 114 may comprise, for example, a charge coupled device (CCD) image sensor or a complimentary metal oxide semiconductor (CMOS) image sensor. Each image sensor 114 may capture brightness, luminance and/or chrominance information.

In exemplary operation, a monoscopic 3D video camera may be integrated in a mobile device such as, for example, in a mobile phone, and one or more other monoscopic 3D video cameras may be installed or located in an area surrounding the mobile device. For example, the one or more other monoscopic 3D video cameras may be utilized in a closed-circuit television (CCTV) monitoring system. In instances when the monoscopic 3D video camera 102 is integrated in the mobile device, the monoscopic 3D video camera 102 may capture 2D video image data and corresponding depth information surrounding the mobile device utilizing the image sensor(s) 114 and the depth sensor(s) 108 respectively. The monoscopic 3D video camera 102 may also emit or transmit signals such as infrared waves, via the emitter 109, to the one or more other monoscopic 3D video cameras for determining distance information between the mobile device and each of the one or more other monoscopic 3D video cameras.

In instances when the monoscopic 3D video camera 102 is utilized in the CCTV monitoring system, the monoscopic 3D video camera 102 may capture 2D video image data and corresponding depth information of a scene near the mobile device utilizing the image sensor(s) 114 and the depth sensor(s) 108 respectively. The depth sensor(s) 108 may also be operable to capture signals which may be transmitted from the emitter in the monoscopic 3D video camera in the mobile device, and then determine the distance information for the mobile device. The monoscopic 3D video camera 102 may store location information of the monoscopic 3D video camera 102 in the memory 106. The location information of the monoscopic 3D video camera 102 may be communicated to the mobile device, and the mobile device may be operable to utilize the location information to determine its location.

Figure 1B:
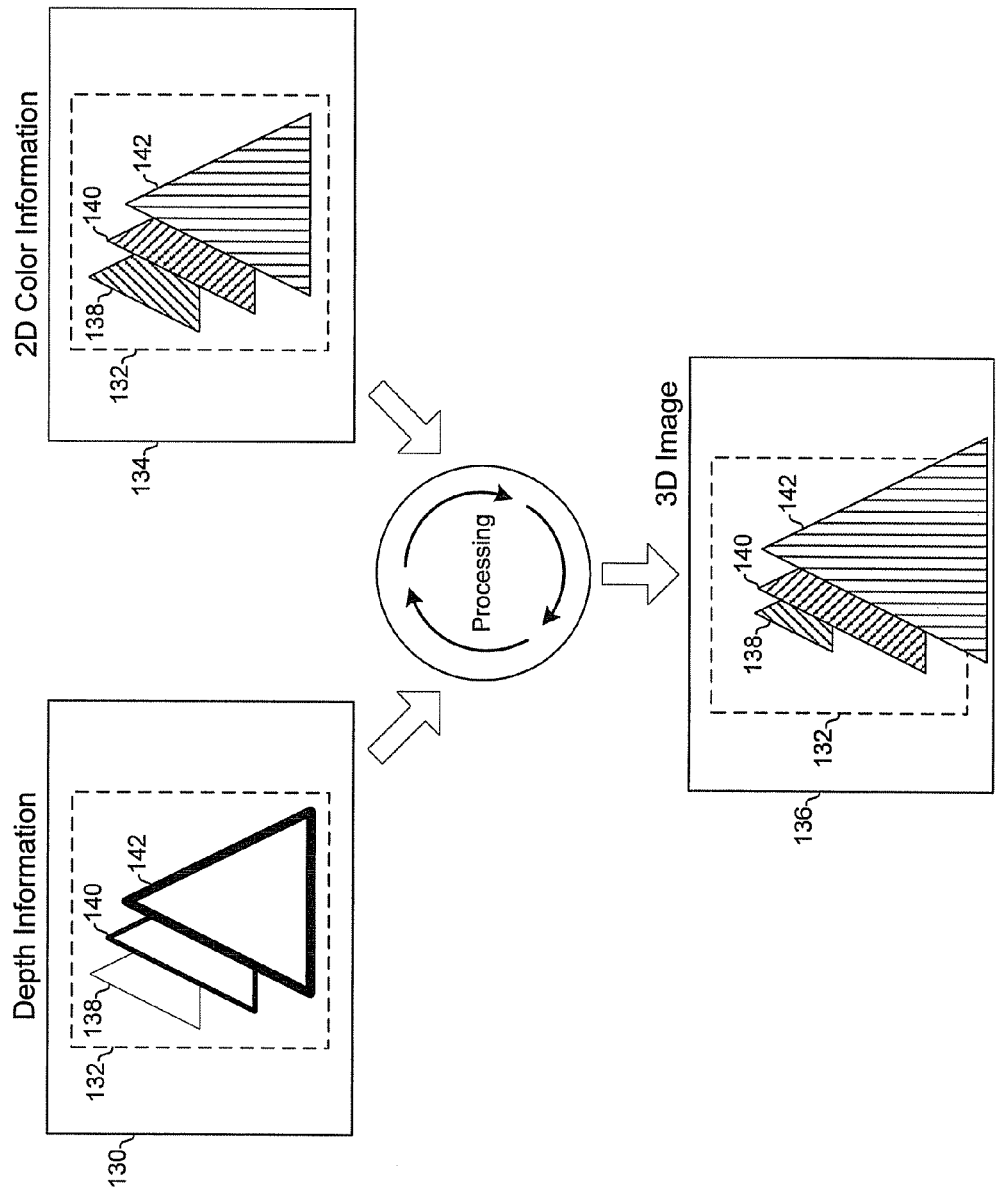
FIG. 1B is a block diagram that illustrates exemplary processing of depth information and 2D color information to generate a 3D image, in accordance with an embodiment of the invention.

FIG. 1B is a block diagram that illustrates exemplary processing of depth information and 2D color information to generate a 3D image, in accordance with an embodiment of the invention. Referring to FIG. 1B, there is shown a frame of depth information 130, a frame of 2D color information 134 and a frame of 3D image 136. The frame of depth information 130 may be captured by the depth sensor(s) 108 and the frame of 2D color information 134 may be captured by the image sensor(s) 114. The frame of depth information 130 may be utilized while processing the frame of 2D color information 134 by the processor 104 to generate the frame of 3D image 136. The dashed line 132 may indicate a reference plane to illustrate the 3D image. In the frame of depth information 130, a line weight is used to indicate depth. In this regard, for example, the heavier the line, the closer that portion of the frame 130 is to a monoscopic 3D video camera 102. Therefore, the object 138 is farthest from the monoscopic 3D video camera 102, the object 142 is closest to the monoscopic 3D video camera, and the object 140 is at an intermediate depth. In various embodiments of the invention, the depth information may be mapped to a grayscale or pseudo-grayscale image by the processor 104.

The image in the frame 134 is a conventional 2D image. A viewer of the frame 134 perceives the same depth between the viewer and each of the objects 138, 140 and 142. That is, each of the objects 138, 140, 142 appears to reside on the reference plane 132. The image in the frame 136 is a 3D image. A viewer of the frame 136 perceives the object 138 being further from the viewer, the object 142 being closest to the viewer, and the object 140 being at an intermediate depth. In this regard, the object 138 appears to be behind the reference plane 132, the object 140 appears to be on the reference plane 132, and the object 142 appears to be in front of the reference plane 132.

Figure 2:
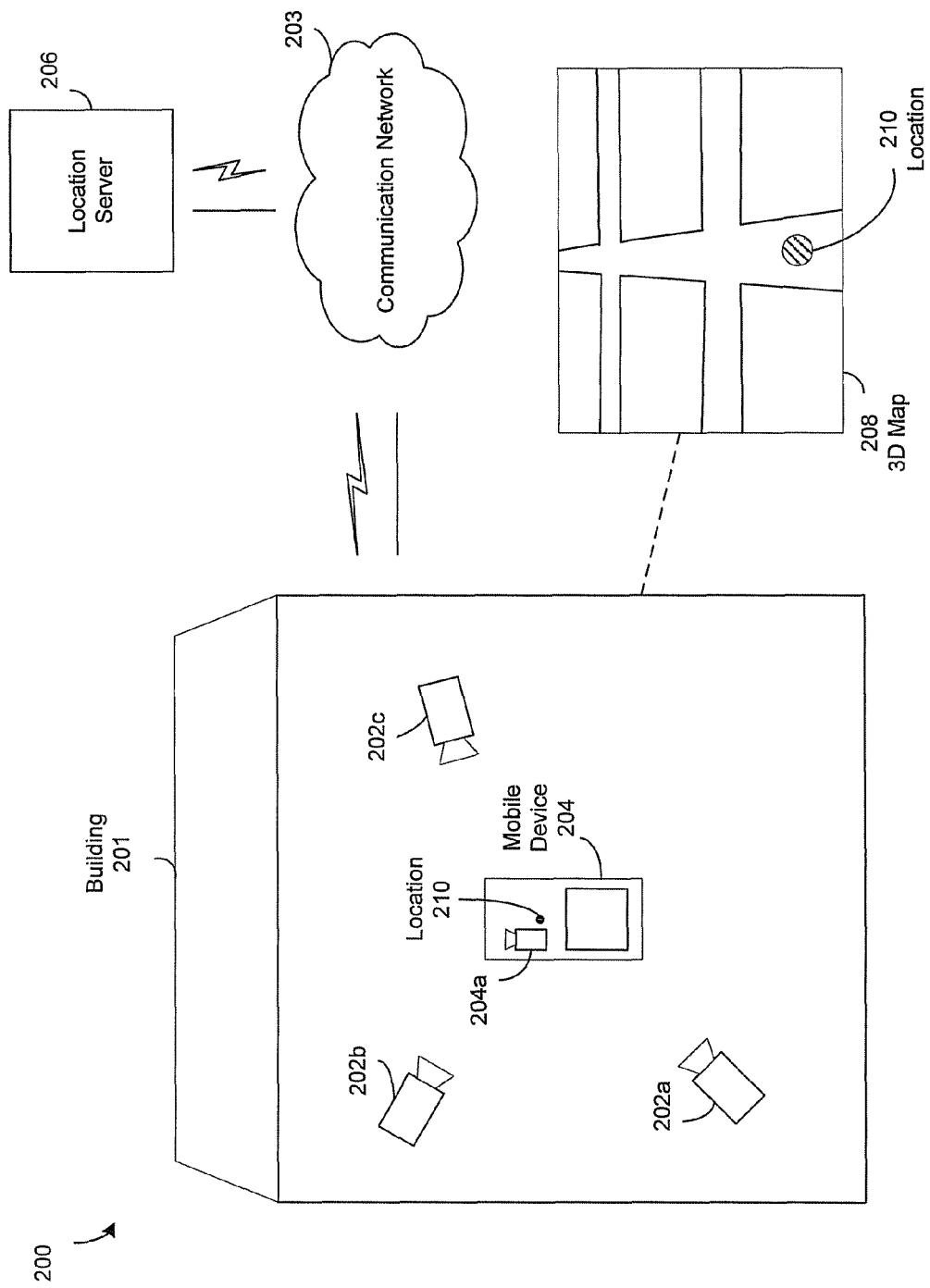
FIG. 2 is a block diagram illustrating an exemplary communication system that is operable to utilize depth information for generating 3D maps, in accordance with an embodiment of the invention.
Figure 5:
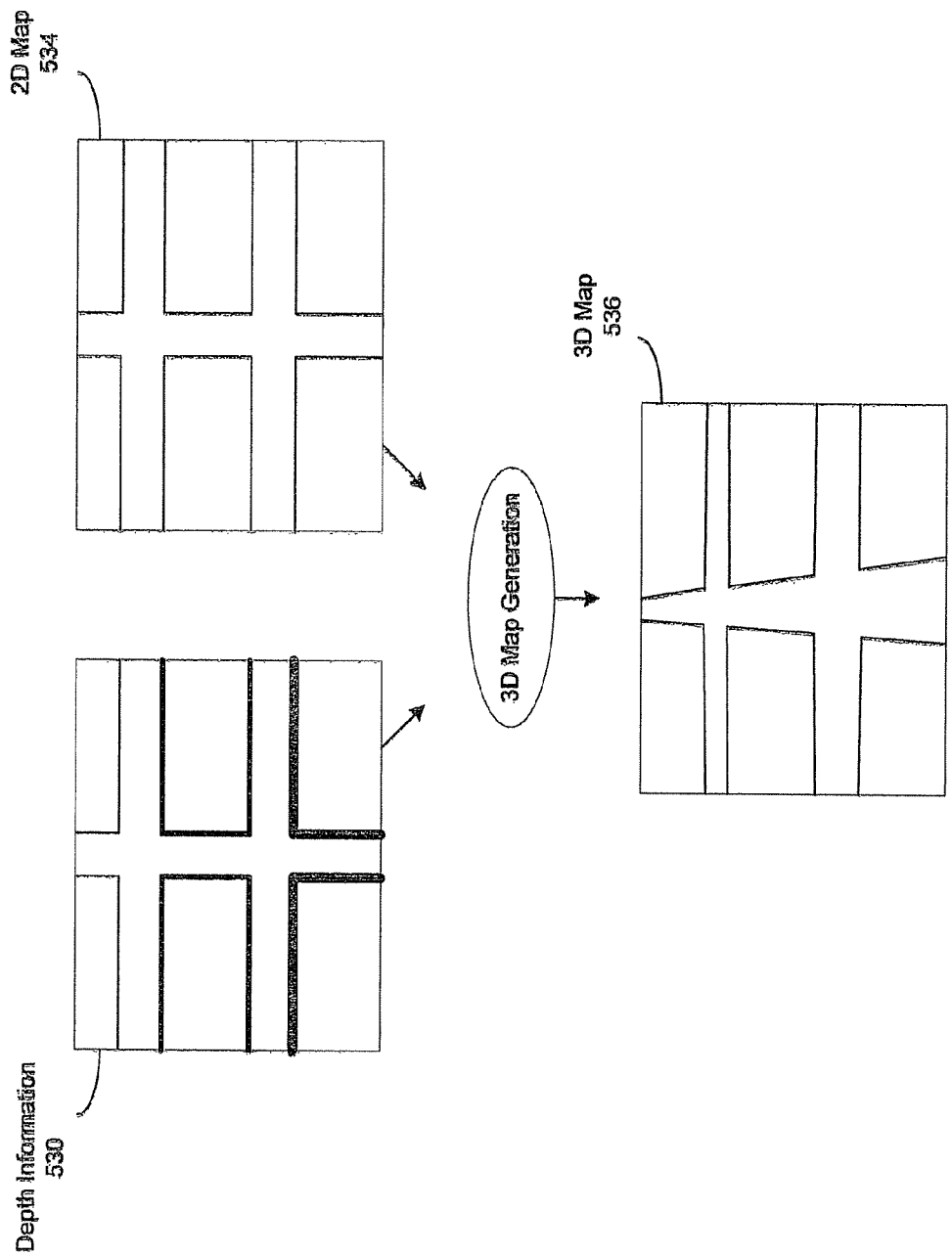
FIG. 5 is a block diagram that illustrates exemplary generation of 3D map utilizing depth information, in accordance with an embodiment of the invention.

In an exemplary embodiment of the invention, in addition to generating the frame of 3D image 136, the frame of depth information 130 may also be utilized to generate a 3D map. Exemplary 3D map generation may be described below with respect to FIG. 5, FIG. 2 is a block diagram illustrating an exemplary communication system that is operable to utilize depth information for generating 3D maps, in accordance with an embodiment of the invention. Referring to FIG. 2, there is shown a communication system 200. The communication system 200 may comprise a location server 206, a communication network 203, a mobile device 204 within a building 201 and a plurality of monoscopic 3D video cameras, of which monoscopic 3D video cameras 202a-202c are illustrated within the building 201. The mobile device 204 may comprise a monoscopic 3D video camera 204a which may be substantially similar to the monoscopic 3D video camera 102 in FIG. 1B. The monoscopic 3D video cameras 202a-202c may be utilized as security monitoring video cameras or closed-circuit television (CCTV) video cameras within the building 201, for example. The monoscopic 3D video cameras 202a-202c may be installed or located in an area surrounding the mobile device 204. Each of the monoscopic 3D video cameras 202a-202c may also be substantially similar to the monoscopic 3D video camera 102 in FIG. 1B.

The location server 206 may comprise suitable logic, circuitry, interfaces and/or code that may be operable to store location information or data and provide the stored location data to various mobile devices such as the mobile device 204 for various applications such as, for example, location-based services (LBS) applications. In an exemplary embodiment of the invention, the location server 206 may receive 2D video image data and corresponding depth information surrounding the mobile device 204. The location server 206 may determine or compute a location such as the location 210 of the mobile device 204 and generate one or more associated 3D maps such as the 3D map 208, based on the 2D video image data and the corresponding depth information. In other instances, the location server 206 may receive location information of the mobile device 204, such as the location 210, from the mobile device 204, for example.

The communication network 203 may comprise suitable logic, circuitry, interfaces, communication devices, and/or code that may be operable to provide communication services to various mobile devices such as the mobile device 204 using wireless and/or wired communication technologies. The communication network 203 may comprise a plurality of RF network devices such as, for example, a cell station, a wireless access point (AP) and/or a FM station. In an exemplary embodiment of the invention, the mobile device 204 may communicate with the location server 206 via the communication network 203.

The mobile device 204 may comprise suitable logic, circuitry, interfaces and/or code that may be operable to communicate radio signals across the communication network 203. The mobile device 204 may comprise the monoscopic 3D video camera 204a. In an exemplary embodiment of the invention, the monoscopic 3D video camera 204a in the mobile device 204 may capture 2D video image data and corresponding depth information surrounding the mobile device 204. The mobile device 204 may communicate or transmit the 2D video image data and the corresponding depth information to the location server 206 via the communication network 203. The mobile device 204 may receive a location, such as the location 210, of the mobile device 204 and one or more associated 3D maps, such as the 3D map 208, from the location server 206 via the communication network 203. The 3D map 208 may be utilized for various applications such as, for example, LBS applications.

In another embodiment of the invention, the monoscopic 3D video camera 204a in the mobile device 204 may emit or transmit one or more signals to one or more of the monoscopic 3D video cameras 202a-202c. Accordingly, each of the one or more of the monoscopic 3D video cameras 202a-202c may be operable to track the mobile device 204 and determine distance information for the mobile device 204. The mobile device 204 may receive, from each of the one or more of the monoscopic 3D video cameras 202a-202c, the distance information and a known location associated with each of the one or more of the monoscopic 3D video cameras 202a-202c. The mobile device 204 may determine a location such as the location 210 of the mobile device 204 based on the distance information and the known location associated with each of the one or more of the monoscopic 3D video cameras 202a-202c. The mobile device 204 may also receive, from each of the one or more of the monoscopic 3D video cameras 202a-202c, 2D video image data and corresponding depth information that are captured by each of the one or more of the monoscopic 3D video cameras 202a-202c. The location 210 of the mobile device 204, the received 2D video image data and the received corresponding depth information may be communicated or transmitted by the mobile device 204 to the location server 206 via the communication network 203. The mobile device 204 may then receive one or more 3D maps such as the 3D map 208, which may be associated with the location 210, from the location server 206 via the communication network 203.

In operation, the monoscopic 3D video cameras 202a-202c may each capture 2D video image data and corresponding depth information of a scene within the building 201. Each of the monoscopic 3D video cameras 202a-202c may store its location information which may be available for communicating to the mobile device 204. In an exemplary embodiment of the invention, the mobile device 204, which comprises the monoscopic 3D video camera 204a, may capture 2D video image data and corresponding depth information surrounding the mobile device 204 utilizing the monoscopic 3D video camera 204a. The mobile device 204 may communicate or transmit the captured 2D video image data and the captured corresponding depth information to the location server 206 via the communication network 203. The location server 206 may be operable to determine or compute a location such as the location 210 for the mobile device 204 based on the 2D video image data and the corresponding depth information. The location server 206 may generate one or more 3D maps such as the 3D map 208 associated with the location 210 of the mobile device 204, based on the corresponding depth information. The mobile device 204 may then receive the location 210 of the mobile device 204 and the one or more associated 3D maps such as the 3D map 208, from the location server 206 via the communication network 203. The 3D map 208 may be utilized for various applications such as, for example, LBS applications within the building 201.

In an exemplary embodiment of the invention, the monoscopic 3D video camera 204a in the mobile device 204 may be operable to emit or transmit one or more signals, such as infrared signals and/or 60 Hz signals, to one or more of the monoscopic 3D video cameras 202a-202c for determining distance information between the mobile device 204 and each of the one or more of the monoscopic 3D video cameras 202a-202c. Accordingly, each of the one or more of the monoscopic 3D video cameras 202a-202c may be operable to track the mobile device 204 and determine distance information for the mobile device 204. The mobile device 204 may receive, from each of the one or more of the monoscopic 3D video cameras 202a-202c, the distance information and a known location associated with each of the one or more of the monoscopic 3D video cameras 202a-202c. The mobile device 204 may determine a location such as the location 210 of the mobile device 204 based on the distance information and the known location associated with each of the one or more of the monoscopic 3D video cameras 202a-202c. In this regard, the location 210 of the mobile device 204 may be determined or computed utilizing a triangulation technique, for example. The mobile device 204 may also receive, from each of the one or more of the monoscopic 3D video cameras 202a-202c, 2D video image data and corresponding depth information that are captured by each of the one or more of the monoscopic 3D video cameras 202a-202c. The mobile device 204 may communicate or transmit the location 210 of the mobile device 204, the received 2D video image data and the received corresponding depth information to the location server 206 via the communication network 203. The location server 206 may generate one or more 3D maps such as the 3D map 208 associated with the location 210 of the mobile device 204, based on the corresponding depth information. The mobile device 204 may then receive the one or more 3D maps such as the 3D map 208, which may be associated with the location 210, from the location server 206 via the communication network 203.

Although monoscopic 3D video cameras 202a-202c, 204a are illustrated in FIG. 2, the invention may not be so limited. Accordingly, other monoscopic 3D video generation devices, which generate 3D video content in 2D-plus-depth formats, may be illustrated without departing from the spirit and scope of various embodiments of the invention.

In the exemplary embodiment of the invention illustrated in FIG. 2, the monoscopic 3D video cameras 202a-202c and the mobile device 204 are in an indoor environment, where it may not be able to acquire or receive global navigation satellite system (GNSS) signals. Notwithstanding, the invention is not so limited and the monoscopic 3D video cameras 202a-202c and the mobile device 204 may be in other environments in which the mobile device 204 is still unable to acquire or receive GNSS signals.

Figure 3:
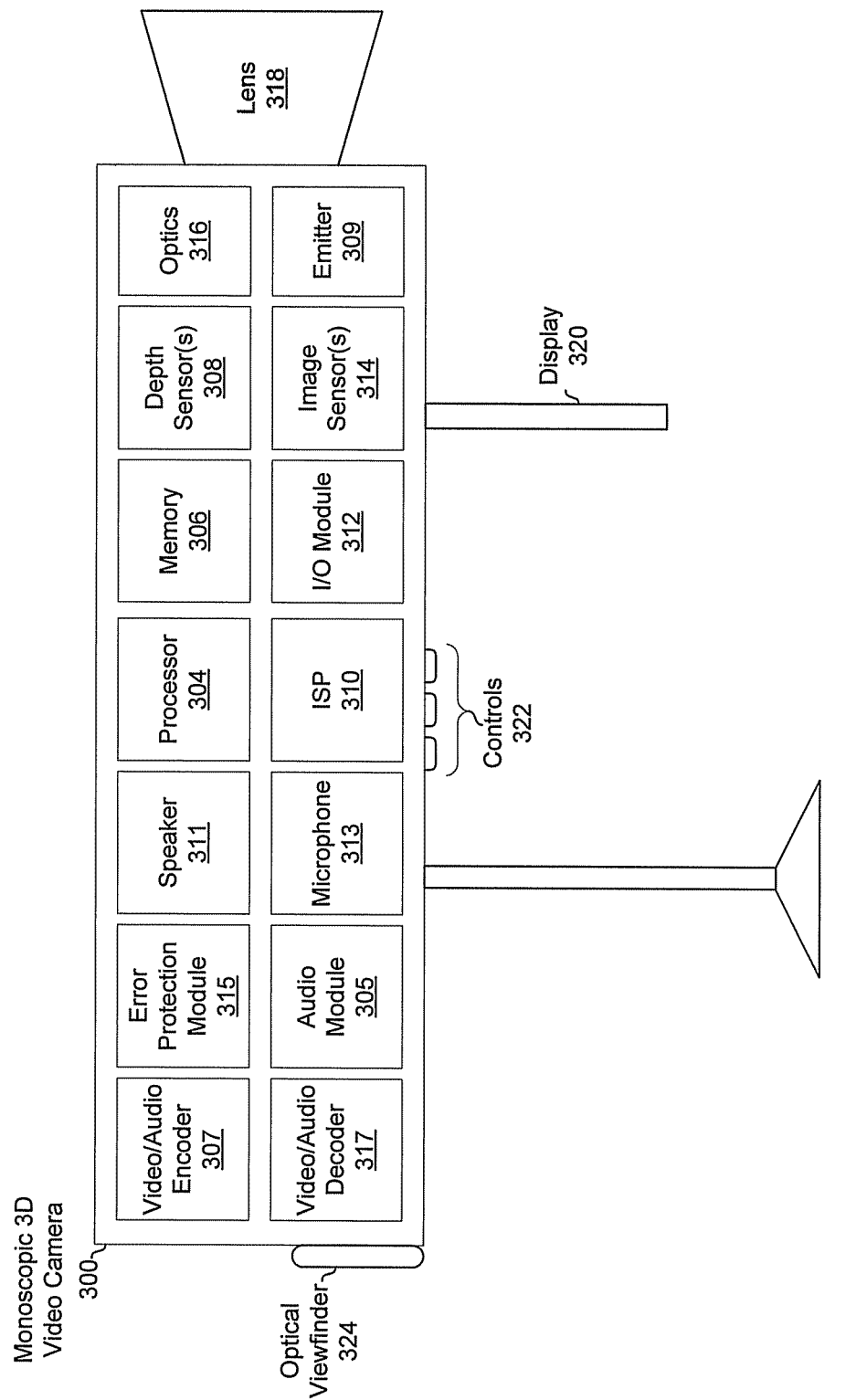
FIG. 3 is a block diagram illustrating an exemplary monoscopic 3D video camera that is operable to utilize depth information for generating 3D maps, in accordance with an embodiment of the invention.

FIG. 3 is a block diagram illustrating an exemplary monoscopic 3D video camera that is operable to utilize depth information for generating 3D maps, in accordance with an embodiment of the invention. Referring to FIG. 3, there is shown a monoscopic 3D video camera 300. The monoscopic 3D video camera 304 may comprise a processor 304, a memory 306, one or more depth sensors 308, an emitter 309, an image signal processor (ISP) 310, an input/output (I/O) module 312, one or more image sensors 314, an optics 316, a speaker 311, a microphone 313, a video/audio encoder 307, a video/audio decoder 317, an audio module 305, an error protection module 315, a lens 318, a plurality of controls 322, an optical viewfinder 324 and a display 320. The monoscopic 3D video camera 300 may be substantially similar to each of the monoscopic 3D video cameras 202a-202c in FIG. 2.

The processor 304 may comprise suitable logic, circuitry, interfaces, and/or code that may be operable to coordinate operation of various components of the monoscopic 3D video camera 300. The processor 304 may, for example, run an operating system of the monoscopic 3D video camera 300 and control communication of information and signals between components of the monoscopic 3D video camera 300. The processor 304 may execute code stored in the memory 306. In an exemplary embodiment of the invention, the processor 304 may track a mobile device such as the mobile device 204 from which an emitted signal is received by the depth sensor(s) 308.

The memory 306 may comprise, for example, DRAM, SRAM, flash memory, a hard drive or other magnetic storage, or any other suitable memory devices. For example, SRAM may be utilized to store data utilized and/or generated by the processor 304 and a hard-drive and/or flash memory may be utilized to store recorded image data and depth data. In an exemplary embodiment of the invention, the memory 306 may store location information of the monoscopic 3D video camera 300.

The depth sensor(s) 308 may each comprise suitable logic, circuitry, interfaces, and/or code that may be operable to detect EM waves in the infrared spectrum and determine depth information based on reflected infrared waves. For example, depth information may be determined based on time-of-flight of infrared waves transmitted by the emitter 309 and reflected back to the depth sensor(s) 308. Depth information may also be determined using a structured light method, for example. In such instance, a pattern of light such as a grid of infrared waves may be projected at a known angle onto an object by a light source such as a projector. The depth sensor(s) 308 may detect the deformation of the light pattern such as the infrared light pattern on the object. Accordingly, depth information for a scene may be determined or calculated using, for example, a triangulation technique. In an exemplary embodiment of the invention, the depth sensor(s) 308 may capture signals that may be emitted or transmitted from an emitter in a monoscopic 3D video camera such as the monoscopic 3D video camera 204a in the mobile device 204. While tracking the mobile device 204 by the processor 304, the depth sensor(s) 308 may determine distance information for the mobile device 204.

The image signal processor or image sensor processor (ISP) 310 may comprise suitable logic, circuitry, interfaces, and/or code that may be operable to perform complex processing of captured image data and captured corresponding depth data. The ISP 310 may perform a plurality of processing techniques comprising, for example, filtering, demosaic, Bayer interpolation, lens shading correction, defective pixel correction, white balance, image compensation, color transformation and/or post filtering.

The audio module 305 may comprise suitable logic, circuitry, interfaces and/or code that may be operable to perform various audio functions of the monoscopic 3D video camera 300. In an exemplary embodiment of the invention, the audio module 305 may perform noise cancellation and/or audio volume level adjustment for a 3D scene.

The video/audio encoder 307 may comprise suitable logic, circuitry, interfaces and/or code that may be operable to perform video encoding and/or audio encoding functions. For example, the video/audio encoder 307 may encode or compress captured 2D video images and corresponding depth information and/or audio data for transmission and/or communication.

The video/audio decoder 317 may comprise suitable logic, circuitry, interfaces and/or code that may be operable to perform video decoding and/or audio decoding functions.

The error protection module 315 may comprise suitable logic, circuitry, interfaces and/or code that may be operable to perform error protection functions for the monoscopic 3D video camera 300. For example, the error protection module 315 may provide error protection to encoded 2D video images and corresponding depth information and/or encoded audio data for transmission and/or communication.

The input/output (I/O) module 312 may comprise suitable logic, circuitry, interfaces, and/or code that may enable the monoscopic 3D video camera 300 to interface with other devices in accordance with one or more standards such as USB, PCI-X, IEEE 1394, HDMI, DisplayPort, wireless and/or analog audio and/or analog video standards. For example, the I/O module 312 may be operable to send and receive signals from the controls 322, output video to the display 320, output audio to the speaker 311, handle audio input from the microphone 313, read from and write to cassettes, flash cards, solid state drives, hard disk drives or other external memory attached to the monoscopic 3D video camera 300, and/or output audio and/or video externally via one or more interfaces such as a IEEE 1394 port, a HDMI, an USB port and/or a wireless interface for transmission and/or rendering. In an exemplary embodiment of the invention, the monoscopic 3D video camera 300 may communicate with a mobile device such as the mobile device 204 via the I/O module 312.

The image sensor(s) 314 may each comprise suitable logic, circuitry, interfaces, and/or code that may be operable to convert optical signals to electrical signals. Each image sensor 314 may comprise, for example, a charge coupled device (CCD) image sensor or a complimentary metal oxide semiconductor (CMOS) image sensor. Each image sensor 314 may capture brightness, luminance and/or chrominance information.

The optics 316 may comprise various optical devices for conditioning and directing EM waves received via the lens 318. The optics 316 may direct EM waves in the visible spectrum to the image sensor(s) 314 and direct EM waves in the infrared spectrum to the depth sensor(s) 308. The optics 316 may comprise, for example, one or more lenses, prisms, luminance and/or color filters, and/or mirrors.

The lens 318 may be operable to collect and sufficiently focus electromagnetic (EM) waves in the visible and infrared spectra.

The display 320 may comprise a LCD display, a LED display, an organic LED (OLED) display and/or other digital display on which images recorded via the monoscopic 3D video camera 300 may be displayed. In an embodiment of the invention, the display 320 may be operable to display 3D images.

The controls 322 may comprise suitable logic, circuitry, interfaces, and/or code that may enable a user to interact with the monoscopic 3D video camera 300. For example, the controls 322 may enable the user to control recording and playback. In an embodiment of the invention, the controls 322 may enable the user to select whether the monoscopic 3D video camera 300 operates in 2D mode or 3D mode.

The optical viewfinder 324 may enable a user to view or see what the lens 318 "sees," that is, what is "In frame".

In operation, the image sensor(s) 314 may capture brightness, luminance and/or chrominance information associated with a 2D video image frame and the depth sensor(s) 308 may capture corresponding depth information. In various embodiments of the invention, various color formats, such as RGB and YCrCb, may be utilized. The depth information may be stored in the memory 306 as metadata or as an additional layer of information, which may be utilized when rendering a 3D video image from the 2D image information.

In an exemplary embodiment of the invention, the location information of the monoscopic 3D video camera 300 may be stored in the memory 306. The depth sensor(s) 308 may also capture signals that may be emitted or transmitted from an emitter in a monoscopic 3D video camera such as the monoscopic 3D video camera 204a in the mobile device 204. Accordingly, the processor 304 may be operable to track the mobile device 204. While tracking the mobile device 204 by the processor 304, the depth sensor(s) 308 may determine distance information for the mobile device 204. The distance information associated with the mobile device 204 and the location information of the monoscopic 3D video camera 300 may be communicated or transmitted to the mobile device 204 via the I/O module 312. The captured 2D video image data and the captured corresponding depth information may also be communicated or transmitted to the mobile device 204 via the I/O module 312. The depth information and the location information may then be utilized by the mobile device 204 to determine or compute a location such as the location 210 of the mobile device 204. The location 210, the 2D video image data and the corresponding depth information may then be utilized by a location server such as the location server 206 to generate a 3D map such as the 3D map 208 associated with the location 210 of the mobile device 204.

Figure 4:
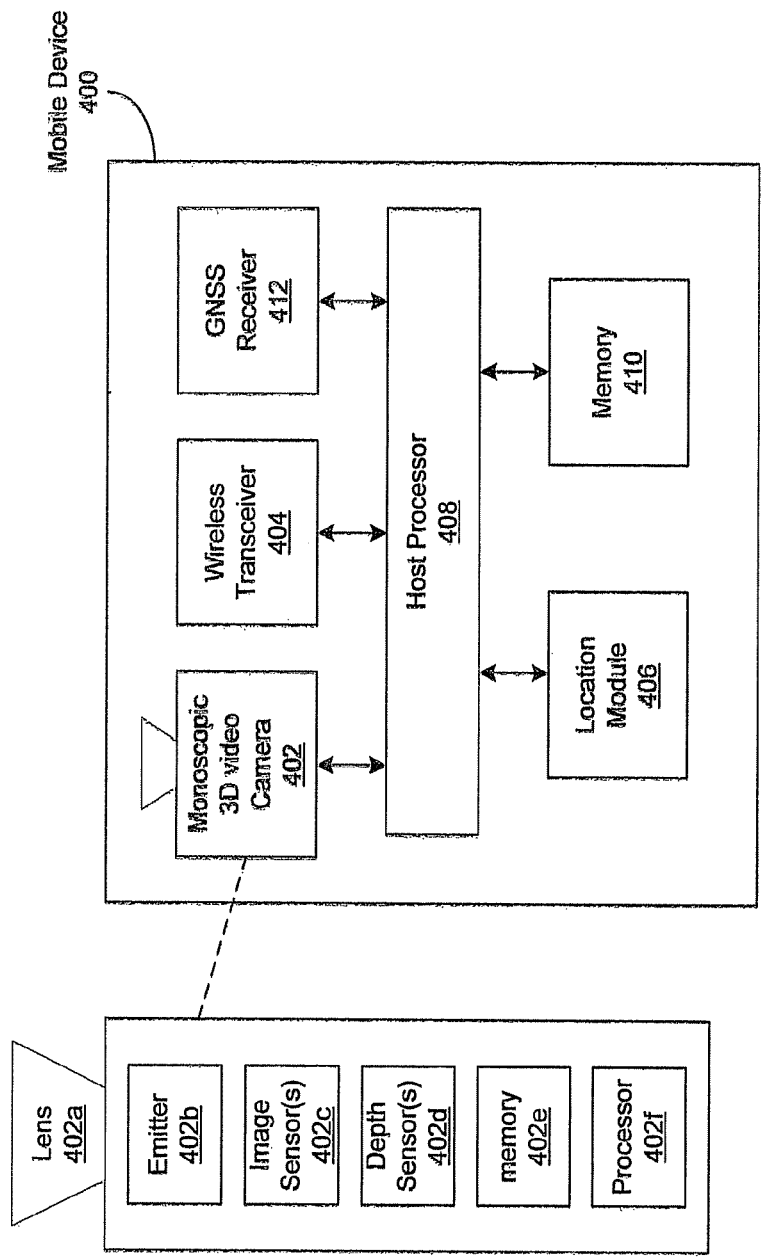
FIG. 4 is a block diagram illustrating an exemplary mobile device that is operable to utilize depth information for generating 3D maps, in accordance with an embodiment of the invention.

FIG. 4 is a block diagram illustrating an exemplary mobile device that is operable to utilize depth information for generating 3D maps, in accordance with an embodiment of the invention. Referring to FIG. 4, there is shown a mobile device 400. The mobile device 400 may comprise a monoscopic 3D video camera 402, a location module 406, a wireless transceiver 404, a GNSS receiver 412, a host processor 408 and a memory 410. The mobile device 400 may be substantially similar to the mobile device 204 in FIG. 2.

The monoscopic 3D video camera 402 may comprise a lens 402a, an emitter 402b, one or more image sensors 402c, one or more depth sensors 402d, a memory 402e and a processor 402f. The monoscopic 3D video camera 402 may be substantially similar to the monoscopic 3D video camera 102 in FIG. 1A. In this regard, the lens 402a, the emitter 402b, the image sensor(s) 402c, the depth sensor(s) 402d, the memory 302e and the processor 402f may be substantially similar to the lens 101c, the emitter 109, the image sensor(s) 114, the depth sensor(s) 108, the memory 106 and the processor 104 in FIG. 1A, respectively.

The location module 406 may comprise suitable logic, circuitry, interfaces and/or code that may be operable to determine and/or receive a location such as the location 210 of the mobile device 400. In an exemplary embodiment of the invention, the location module 406 may receive, from a location server such as the location server 206, one or more 3D maps such as the 3D map 208 associated with the location 210 of the mobile device 400, via the wireless transceiver 404.

The wireless transceiver 404 may comprise suitable logic, circuitry, interfaces and/or code that may be operable to communicate radio signals over a communication network such as the communication network 203 using various wireless access technologies. For example, the wireless transceiver 404 may be operable to communicate with cell stations and/or wireless APs in the communication network 203. In an exemplary embodiment of the invention, the wireless transceiver 404 may be operable to communicate with monoscopic 3D video cameras nearby the mobile device 400, such as the monoscopic 3D video cameras 202a-202c.

The GNSS receiver 412 may comprise suitable logic, circuitry, interfaces and/or code that may be operable to detect and receive GNSS signals from a plurality of visible GNSS satellites. The GNSS receiver 412 may utilize the received GNSS signals to calculate navigation information or solution such as a position fix and/or velocity of the GNSS receiver 412. In an exemplary embodiment of the invention, the mobile device 400 may be in an indoor environment or other environment where the GNSS receiver 412 may not be able to receive GNSS signals.

The host processor 408 may comprise suitable logic, circuitry, interfaces and/or code that may be operable to process signals from the wireless transceiver 404, the location module 406, the GNSS receiver 412 and/or the monoscopic 3D video camera 402. The host processor 408 may manage and/or control operations of the wireless transceiver 404, the location module 406, the GNSS receiver 412 and/or the monoscopic 3D video camera 402. The host process 408 may be operable to communicate signals with the communication network 203 via the wireless transceiver 404. The host processor 408 may also communicate navigation information with the communication network 203 for various location-based services (LBS).

The memory 410 may comprise suitable logic, circuitry, interfaces and/or code that may be operable to store information such as executable instructions, data and/or database that may be utilized by the host processor 408, the location module 406 and/or other modules in the mobile device 400. The memory 410 may comprise RAM, ROM, low latency non-volatile memory such as flash memory and/or other suitable electronic data storage.

In exemplary operation, the monoscopic 3D video camera 402 may utilize the image sensor(s) 402c and the depth sensor(s) 402d to capture 2D video image data and corresponding depth information respectively for the area or region surrounding the mobile device 400. The mobile device 400 may communicate or transmit the captured 2D video image data and the captured corresponding depth information to the location server 206 via the wireless transceiver 404. The location server 206 may be operable to determine or compute a location such as the location 210 for the mobile device 400 based on the 2D video image data and the corresponding depth information. The location server 206 may generate one or more 3D maps such as the 3D map 208 associated with the location 210 of the mobile device 400, based on the corresponding depth information. The location module 406 may then receive the location 210 of the mobile device 400 and the one or more associated 3D maps such as the 3D map 208, from the location server 206 via the wireless transceiver 404. The 3D map 208 may be utilized for various applications such as, for example, LBS applications.

In an exemplary embodiment of the invention, the monoscopic 3D video camera 402 may emit or transmit, via the emitter 402b, one or more signals to one or more of monoscopic 3D video cameras such as the monoscopic 3D video cameras 202a-202c nearby the mobile device 400 for determining distance information between the mobile device 400 and each of the one or more of the monoscopic 3D video cameras 202a-202c. Accordingly, each of the one or more of the monoscopic 3D video cameras 202a-202c may be operable to track the mobile device 400 and determine distance information for the mobile device 400. The mobile device 400 may receive, from each of the one or more of the of the monoscopic 3D video cameras 202a-202c, the distance information and a known location associated with each of the one or more of the monoscopic 3D video cameras 202a-202c, via the wireless transceiver 404. The location module 406 may determine a location such as the location 210 of the mobile device 400 based on the distance information and the known location associated with each of the one or more of the monoscopic 3D video cameras 202a-202c. In this regard, for example, the location module 406 may determine or compute the location 210 of the mobile device 400 utilizing a triangulation technique.

The mobile device 400 may also receive, via the wireless transceiver 404, 2D video image data and corresponding depth information that are captured by each of the one or more of the monoscopic 3D video cameras 202a-202c. The mobile device 400 may communicate or transmit the location 210 of the mobile device 400, the received 2D video, image data and the received corresponding depth information to the location server 206 via the wireless transceiver 404. The location server 206 may generate one or more 3D maps such as the 3D map 208 associated with the location 210 of the mobile device 400, based on the corresponding depth information. The location module 406 may then receive the one or more 3D maps such as the 3D map 208, which may be associated with the location 210, from the location server 206 via the wireless transceiver 404.

FIG. 5 is a block diagram that illustrates exemplary generation of 3D map utilizing depth information, in accordance with an embodiment of the invention. Referring to FIG. 5, there is shown a frame of 2D map 534, a frame of depth information 530 and a frame of 3D map. In the frame of depth information 530, a line weight is used to indicate depth as described above with respect to FIG. 1B.

In an exemplary embodiment of the invention, a location server such as the location server 206 may generate the frame of 3D map 536 utilizing the frame of 2D map 534 and the frame of depth information 530. The generated frame of 3D map 536 may be communicated to a mobile device such as the mobile device 204 for LBS applications, for example.

Figure 6:
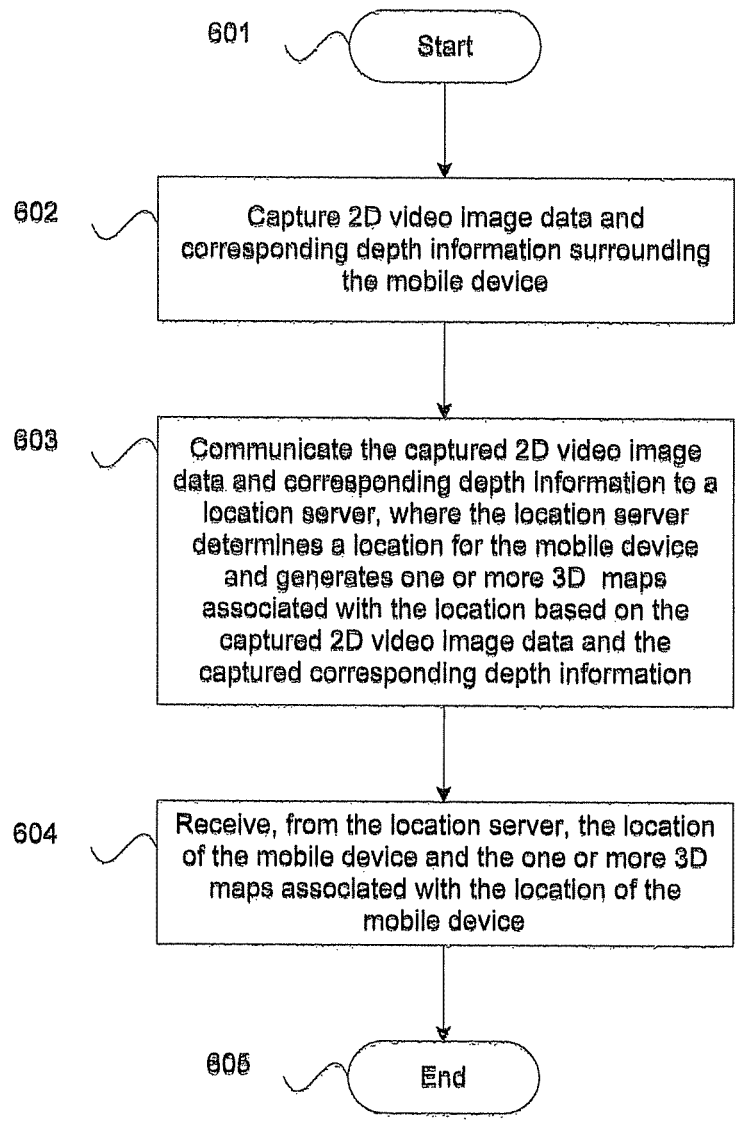
FIG. 6 is a flow chart illustrating exemplary steps for utilizing depth information for generating 3D maps, in accordance with an embodiment of the invention.

FIG. 6 is a flow chart illustrating exemplary steps for utilizing depth information for generating 3D maps, in accordance with an embodiment of the invention. Referring to FIG. 6, the exemplary steps start at step 601. In step 602, the monoscopic 3D video camera 402 in the mobile device 400 may capture 2D video image data and corresponding depth information surrounding the mobile device 400 via the image sensor(s) 402c and the depth sensor(s) 402d respectively. In step 603, the mobile device 400 may communicate the captured 2D video image data and the captured corresponding depth information to a location server such as the location server 206 via the wireless transceiver 404 in the mobile device 400. The location server 206 may determine or compute a location such as the location 210 for the mobile device 400 and generate one or more 3D maps such as the 3D map 208 associated with the location 210 of the mobile device 400, based on the captured 2D video image data and the captured corresponding depth information. In step 604, the location module 406 in the mobile device 400 may receive, from the location server 206, the location 210 of the mobile device 400 and the one or more 3D maps such as the 3D map 208 associated with the location 210 of the mobile device 400, via the wireless transceiver 404. The exemplary steps may proceed to the end step 605.

Figure 7:
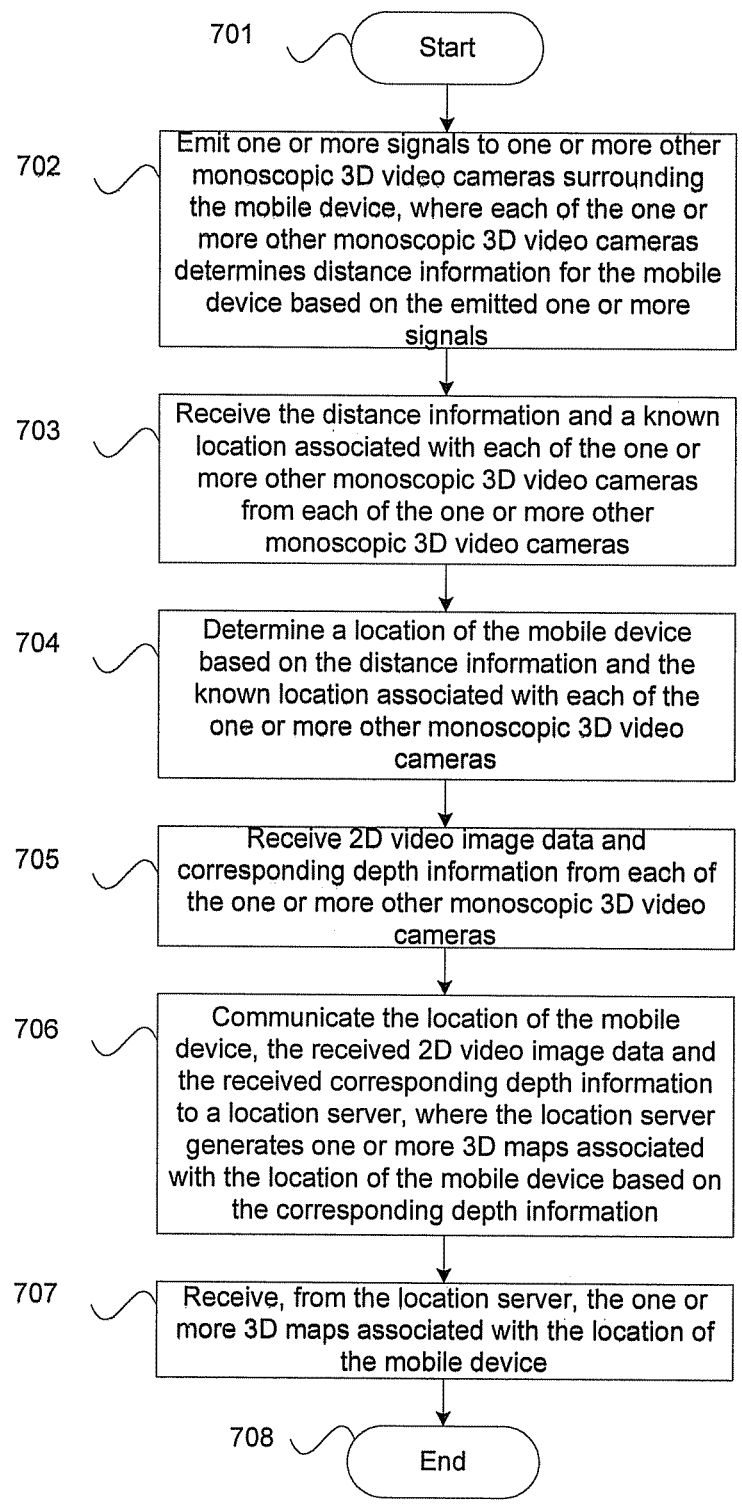
FIG. 7 is a flow chart illustrating exemplary steps for utilizing depth information for generating 3D maps, in accordance with an embodiment of the invention.

FIG. 7 is a flow chart illustrating exemplary steps for utilizing depth information for generating 3D maps, in accordance with an embodiment of the invention, Referring to FIG. 7, the exemplary steps start at step 701. In step 702, the monoscopic 3D video camera 402 in the mobile device 400 may emit, via the emitter 402b, one or more signals to one or more other monoscopic 3D video cameras such as the monoscopic 3D video cameras 202a-202c surrounding the mobile device 400 for determining distance information between the mobile device 400 and each of the one or more other monoscopic 3D video cameras 202a-202c. Each of the one or more other monoscopic 3D video cameras 202a-202c may be operable to track the mobile device 400 and determine distance information for the mobile device 400, based on the emitted one or more signals. In step 703, the mobile device 400 may receive, via the wireless transceiver 404 in the mobile device 400, the distance information and a known location associated with each of the one or more other monoscopic 3D video cameras 202a-202c from each of the one or more other monoscopic 3D video cameras 202a-202c. In step 704, the location module 406 in the mobile device 400 may determine a location such as the location 210 of the mobile device 400 based on the distance information and the known location associated with each of the one or more other monoscopic 3D video cameras 202a-202c. In this regard, for example, the location module 406 may determine or compute the location 210 of the mobile device 400 utilizing a triangulation technique.

In step 705, the mobile device 400 may receive, via the wireless transceiver 404, 2D video image data and corresponding depth information from each of the one or more other monoscopic 3D video cameras 202a-202c. In step 706, the mobile device 400 may communicate the location 210 of the mobile device 400, the received 2D video image data and the received corresponding depth information to a location server such as the location server 206 via the wireless transceiver 404. The location server 206 may generate one or more 3D maps such as the 3D map 208 associated with the location 210 of the mobile device 400, based on the corresponding depth information, in step 707, the location module 406 may receive, from the location server 206, the one or more 3D maps such as the 3D map 208 associated with the location 210 of the mobile device 400, via the wireless transceiver 404. The exemplary steps may proceed to the end step 708.

Figure 8:
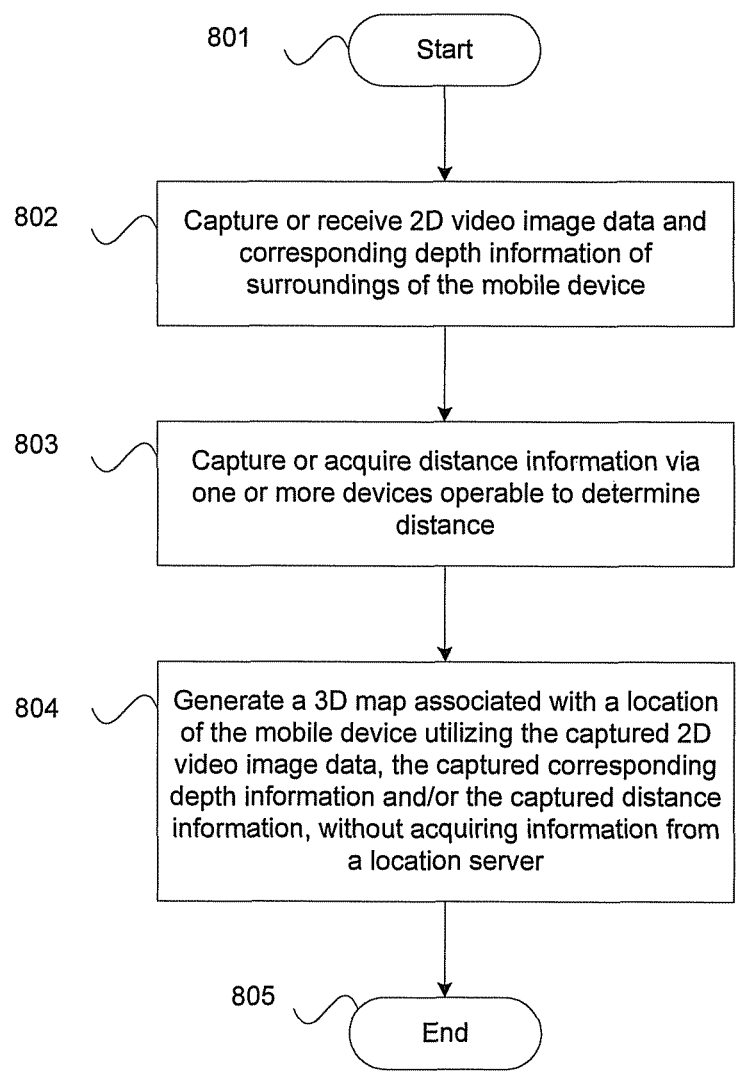
FIG. 8 is a flow chart illustrating exemplary steps for utilizing depth information for generating 3D maps, in accordance with an embodiment of the invention.

FIG. 8 is a flow chart illustrating exemplary steps for utilizing depth information for generating 3D maps, in accordance with an embodiment of the invention. Referring to FIG. 8, the exemplary steps start at step 801. In step 802, the mobile device 400 may capture or receive 2D video image data and corresponding depth information of surroundings of the mobile device 400. In step 803, the mobile device 400 may capture or acquire distance information via one or more devices operable to determine distance such as, for example, the emitter 402b. In step 804, the location module 406 in the mobile device 400 may generate a 3D map, such as the 3D map 208, associated with a location, such as the location 210, of the mobile device 400 utilizing the captured 2D video image data, the captured corresponding depth information and/or the captured distance information, without acquiring information from a location server, such as the location server 206. The exemplary steps may proceed to the end step 805.

In various embodiments of the invention, a mobile device 400 may comprise a monoscopic 3D video generation device such as the monoscopic 3D video camera 402. The mobile device 400 may be operable to communicate at least 2D video image data and corresponding depth information surrounding the mobile device 400 to a location server such as the location server 206, via the wireless transceiver 404 in the mobile device 400. The location server 206 may generate one or more 3D maps such as the 3D map 208 associated with a location such as the location 210 of the mobile device 400, based on the corresponding depth information. The mobile device 400 may be operable to receive the one or more 3D maps such as the 3D map 208 from the location server 206, via the wireless transceiver 404. In this regard, the monoscopic 3D video camera 402 in the mobile device 400 may comprise an emitter 402b and one or more depth sensors 402d.

In an exemplary embodiment of the invention, the 2D video image data may be captured via, for example, one or more image sensors 402c in the monoscopic 3D video camera 402 in the mobile device 400. The corresponding depth information may be captured via, for example, the one or more depth sensors 402d in the monoscopic 3D video camera 402 in the mobile device 400. The mobile device 400 may communicate the captured 2D video image data and the captured corresponding depth information to the location server 206, via the wireless transceiver 404. In such instances, the location server 206 may determine the location 210 of the mobile device 400 based on the 2D video image data and the corresponding depth information. The location server 206 may generate the one or more 3D maps such as the 3D map 208 associated with the location 210 of the mobile device 400 based on the corresponding depth information. The location module 406 in the mobile device 400 may be operable to receive, via the wireless transceiver 404, the location 210 of the mobile device 400 and the one or more 3D maps such as the 3D map 208 from the location server 206.

In an exemplary embodiment of the invention, the mobile device 400 may be operable to emit one or more signals, via the emitter 402b in the monoscopic 3D video camera 402 in the mobile device 400, to one or more other monoscopic 3D video generation devices, such as the monoscopic 3D video cameras 202a-202c surrounding the mobile device 400. In this regard, each of the one or more other monoscopic 3D video cameras 202a-202c may determine distance information for the mobile device 400 based on the emitted one or more signals. The mobile device 400 may receive, from each of the one or more other monoscopic 3D video cameras 202a-202c, the distance information and a known location associated with each of the one or more, other monoscopic 3D video cameras 202a-202c, via the wireless transceiver 404. The mobile device 400 may also receive, from each of the one or more other monoscopic 3D video cameras 202a-202c, the 2D video image data and the corresponding depth information that are captured by each of the one or more other monoscopic 3D video cameras 202a-202c. In such instances, the location module 406 may be operable to determine the location such as the location 210 of the mobile device 400 based on the received distance information and the known location associated with each of the one or more other monoscopic 3D video cameras 202a-202c. The location 210 of the mobile device 400, the received 2D video image data and the received corresponding depth information may be communicated by the mobile device 400 to the location server 206, via the wireless transceiver 404. The location server 206 may then generate the one or more 3D maps such as the 3D map 208 associated with the location 210 of the mobile device 400, based on the corresponding depth information. In one embodiment of the invention, the mobile device 400 may be in an indoor environment such as in the building 201.

In various embodiments of the invention, a mobile device 400 may comprise a monoscopic 3D video generation device such as the monoscopic 3D video camera 402. The mobile device 400 may also comprise one or more depth sensors such as the depth sensor(s) 402d in the monoscopic 3D video camera 402, and one or more devices operable to determine distance. The mobile device 400 may be operable to capture or receive 2D video image data and corresponding depth information of surroundings of the mobile device 400. The mobile device 400 may be operable to capture or receive distance information via the one or more devices that are operable to determine distance. A 3D map may be rendered by location module 306 in the mobile device utilizing the captured 2D video image data, the captured corresponding depth information and/or the captured distance information. In this regard, the monoscopic 3D video camera 402 may comprise one or more image sensors 402c. The one or more devices operable to determine distance may comprise an optical and/or electromagnetic emitting device, such as, for example, the emitter 402b in the monoscopic 3D video camera 402. In one embodiment of the invention, the 3D map may be generated by the location module 406 in mobile device 400 without acquiring information from a location server such as the location server 206. In another embodiment of the invention, the 3D map may be generated by the location module 406 based on information received from a location server such as the location server 206, for example.

In an exemplary embodiment of the invention, the 2D video image data may be captured via the one or more image sensors 402c of the monoscopic 3D video camera 402, and the corresponding depth information may be captured via the one or more depth sensors 402d. The mobile device 400 may be operable to communicate the captured 2D video image data and the captured corresponding depth information to the location server 206 via the wireless transceiver 404. The location server 206 may be operable to determine a location of the mobile device, such as the location 210, based on the 2D video image data and the corresponding depth information, and generate the 3D map, such as the 3D map 208, associated with the location 210 of the mobile device 400 based on the corresponding depth information. The mobile device 400 may receive the generated location 210 of the mobile device 400 and the 3D map 208, via the wireless transceiver 404, from the location server 206.

In an exemplary embodiment of the invention, the mobile device 400 may be operable to emit one or more signals, via the one or more devices operable to determine distance such as the emitter 402b, to one or more other monoscopic 3D video generation devices, such as the monoscopic 3D video cameras 202a-202c surrounding the mobile device 400. In this regard, each of the one or more other monoscopic 3D video cameras 202a-202c may determine distance information for the mobile device 400 based on the emitted one or more signals. The mobile device 400, may receive the distance information and a known location associated with each of the one or more other monoscopic 3D video cameras 202a-202c, via the wireless transceiver 404, from each of the one or more other monoscopic 3D video cameras 202a-202c. In addition, the mobile device 400 may receive, from each of the one or more other monoscopic 3D video cameras 202a-202c, the 2D video image data and the corresponding depth information that are captured by each of the one or more other monoscopic 3D video cameras 202a-202c. In this regard, the location module 406 may be operable to determine a location such as the location 210 of the mobile device 400 based on the received distance information and the known location associated with each of the one or more other monoscopic 3D video cameras 202a-202c. The mobile device 400 may communicate or transmit the location 210 of the mobile device 400, the 2D video image data and the corresponding depth information to the location server 206, via the wireless transceiver 404. The location server 206 may be operable to generate the 3D map such as the 3D map 208 associated with the location 210 of the mobile device 400 based on the corresponding depth information. The mobile device 400 may then receive the generated 3D map 208 from the location server 206, via the wireless transceiver 404.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing depth information for generating 3D maps.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
capturing by a mobile device, two-dimensional (2D) video image data and corresponding depth information of surroundings of said mobile device, wherein said mobile device comprises a monoscopic three-dimensional (3D) video generation device with one or more image sensors and one or more depth sensors;
capturing distance information via one or more devices operable to determine distance, wherein said one or more devices comprise a monoscopic three-dimensional (3D) video generation device and said
distance information indicates distance between said mobile device and one or more other monoscopic 3D video generation devices, said distance information being different than said depth information captured by said mobile device;

communicating said captured 2D video image data, said corresponding depth information, and said distance information to a location server, wherein said location server determines a location of said mobile device based on contents of said 2D video image data, said captured corresponding depth information, and said distance information;

rendering, by said location server, a 3D map of a surrounding of said mobile device by utilizing said captured 2D video image data, said corresponding depth information, and said location of said mobile device;

receiving, by said mobile device, said location of said mobile device and said 3D map from said location server.

2. The method according to claim 1, wherein said one or more devices operable to determine distance comprises an optical and/or electromagnetic emitting device.

3. The method according to claim 1, comprising generating said 3D map by said mobile device.

4. The method according to claim 1, comprising:
capturing said 2D video Image data via said one or more image sensors of said monoscopic 3D video generation device; and
capturing said corresponding depth information via said one or more depth sensors.

5. The method according to claim 1, comprising emitting one or more signals, via said one or more devices operable to determine said distance, to said one or more other monoscopic 3D video generation devices surrounding said mobile device, wherein each of said one or more other monoscopic 3D video generation devices determines said distance information for said mobile device based on said emitted one or more signals.

6. The method according to claim 5, comprising:
receiving said distance information and a known location associated with each of said one or more other monoscopic 3D video generation devices from each of said one or more other monoscopic 3D video generation devices; and
receiving said 2D video image data and said corresponding depth information, which are captured by each of said one or more other monoscopic 3D video generation devices, from each of said one or more other monoscopic 3D video generation devices.

7. The method according to claim 6, comprising determining said location of said mobile device based on said received distance information and said known location associated with each of said one or more other monoscopic 3D video generation devices.

8. A system for communication, the system comprising:
a mobile device which comprises a monoscopic three-dimensional (3D) video generation device with one or more image sensors and one or more depth sensors, capturing two-dimensional (2D) video image data and corresponding depth information of surroundings of said mobile device;
one or more devices, which comprise a monoscopic three-dimensional (3D) video generation device with one or more image sensors and one or more depth sensors, determining distance information indicating distance between said mobile device and said one or more other monoscopic 3D video generation devices, wherein said distance information being different than said depth information captured by said mobile device;
a location server communicating said captured 2D video image data, said captured corresponding depth information, and said distance information to determine a location of said mobile device based on contents of said 2D video image data, said corresponding depth information, and said distance information and rendering a 3D map of a surrounding of said mobile device by utilizing said captured 2D video image data, said captured corresponding depth information and said location of said mobile device, said mobile device further receiving said location of said mobile device and said 3D map from said location server.

9. The system according to claim 8, wherein said one or more devices operable to determine distance comprises an optical and/or electromagnetic emitting device.

10. The system according to claim 8, wherein said one or more processors and/or circuits are operable to generate said 3D map by said mobile device.

11. The system according to claim 8, wherein said one or more processors and/or circuits are operable to generate said 3D map by said mobile device based on said location information of said mobile device received from said location server.

12. The system according to claim 11, wherein said one or more processors and/or circuits are operable to:
capture said 2D video image data via said one or more image sensors of said monoscopic 3D video generation device; and
capture said corresponding depth information via said one or more depth sensors.

13. The system according to claim 11, wherein each of said one or more other monoscopic 3D video generation devices determines said distance information for said mobile device based on said emitted one or more signals, and said one or more processors and/or circuits are further operable to:
receive said distance information and a known location associated with each of said one or more other monoscopic 3D video generation devices from each of said one or more other monoscopic 3D video generation devices; and
receive said 2D video image data and said corresponding depth information, which are captured by each of said one or more other monoscopic 3D video generation devices, from each of said one or more other monoscopic 3D video generation devices.

14. The system according to claim 13, wherein said mobile device is operable to determine said location of said mobile device based on said received distance information and said known location associated with each of said one or more other monoscopic 3D video generation devices.

15. The system according to claim 14, wherein said mobile device is operable to:
receive said 3D map from said location server, wherein said location server generates said 3D map associated with said location of said mobile device based on said 2D video image data, said corresponding depth information, and said distance information.

16. A mobile device comprising:
an image sensor configured to capture two-dimensional (2D) image data of surroundings of the mobile device;
a depth sensor configured to capture depth information of surroundings of the mobile device corresponding to the 2D image data;
a distance measurement device configured to emit a signal to a device at a known location, the distance measurement device further configured to receive, from the device at the known location, a distance information including the distance between the mobile device and the device at the know location, the distance being different than the depth information captured by the depth sensor;

an interface configured to communicate captured information to a server, the captured information comprising the 2D image data, the depth information, and the distance information, wherein the server determines a location of the mobile device based on the communicated captured information;

the interface further configured to receive the location from the server; and a processor configured to render a 3D map of the surroundings and indicate the location of the mobile device on the 3D map using the 2D image data, the depth information, and the received distance information.

17. The mobile device of claim 16, wherein the processor is further configured to generate the 3D map of the surroundings using the captured information.

18. The mobile device of claim 16, wherein the 3D map of the surroundings is received from the server, wherein the server generates the 3D map using the captured information communicated by the mobile device.

19. The mobile device of claim 16, wherein the captured information further comprises image data and depth information captured by the device at the known location.

20. The mobile device of claim 19, wherein the image data and the depth information captured by the device at the known location is used to generate the 3D map.

* * * * *